US006243763B1

(12) United States Patent
Brodsky et al.

(10) Patent No.: US 6,243,763 B1
(45) Date of Patent: Jun. 5, 2001

(54) METHOD FOR SENDING A MESSAGE TO A GROUP AND THE GROUP BROADCASTS THE MESSAGE TO ITS MEMBERS OR REFERENCES WITHIN AN OBJECT-ORIENTED SYSTEM

(75) Inventors: Stephen Andrew Brodsky, Los Gatos; Gary Charles Doney, Sunnyvale; Michael Morris Golding, Palo Alto; Timothy James Grose, Sunnyvale, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/850,214

(22) Filed: May 2, 1997

Related U.S. Application Data

(63) Continuation-in-part of application No. 08/747,415, filed on Nov. 12, 1996, now Pat. No. 5,893,913, which is a continuation-in-part of application No. 08/747,414, filed on Nov. 12, 1996, now Pat. No. 6,011,559, which is a continuation-in-part of application No. 08/747,416, filed on Nov. 12, 1996, now Pat. No. 5,917,498, which is a continuation-in-part of application No. 08/747,057, filed on Nov. 12, 1996, now Pat. No. 5,907,706, which is a continuation-in-part of application No. 08/747,058, filed on Nov. 12, 1996, now Pat. No. 5,983,016, which is a continuation-in-part of application No. 08/747,417, filed on Nov. 12, 1996, now Pat. No. 5,991,536.

(51) Int. Cl.$^7$ .................................................... G06F 9/54
(52) U.S. Cl. ............................................................ 709/316
(58) Field of Search ..................................... 709/310–332

(56) References Cited

U.S. PATENT DOCUMENTS

| 5,257,363 | 10/1993 | Shapiro et al. . |
| 5,303,379 | 4/1994 | Khoyi et al. . |
| 5,315,703 | 5/1994 | Matheny et al. . |
| 5,325,533 | 6/1994 | McInerney et al. . |
| 5,341,478 | * 8/1994 | Travis, Jr. et al. .................. 709/200 |
| 5,437,025 | 7/1995 | Bale et al. . |
| 5,493,682 | 2/1996 | Tyra et al. . |
| 5,537,630 | 7/1996 | Berry et al. . |
| 5,778,225 | * 7/1998 | Super-Issen .......................... 709/103 |

OTHER PUBLICATIONS

Kenneth P. Birman, The Process Group Approach To Reliable Distributed Computing, Dec. 1993, vol. 36, No. 12, ACM, p. 37–53.*
Simon et al., Communication Control in Computer Suported Cooperative Work Systems, Oct. 1994, ACM, p. 311–321.*
Kaashoek et al., "Efficient Reliable Group Communication for Distributed Systems," Vrije Univ., Amsterdam (Netherlands), pp(48), Jun. 1992.*
Keidar et al., "Efficient Message Ordering in Dynamic Networks," ACM 0–89791–800–2/96/05, pp. 68–76, May 1996.*
Printout of Search of Data Base : USPA, Search 1: Attribute$ and (Object or Objects) and (Batch 1), Printed Wednesday, Oct. 30, 1996 13:24, Refattri Infogat2 A1, pp. 1–8.

* cited by examiner

Primary Examiner—St. John Courtenay, III
(74) Attorney, Agent, or Firm—Gates & Cooper LLP

(57) ABSTRACT

A method, apparatus, and article of manufacture which provides for sending a message to a group and the group then broadcasting the message to the members of the group within an object-oriented system. The method comprises the steps of creating a first sending object and a group in a memory of a computer, the group being comprised of one or more receiving objects, sending a first message to the first sending object, sending a second message from the first sending object to the group based on the receipt of the first message, and broadcasting the second message to every object in the group.

18 Claims, 20 Drawing Sheets

METHOD FOR SENDING A MESSAGE TO A GROUP AND THE GROUP BROADCASTS THE MESSAGE TO ITS MEMBERS OR REFERENCES WITHIN AN OBJECT-ORIENTED SYSTEM

CROSS-REFERENCE TO RELATED APPLICATIONS

This application is a continuation-in-part of the following and commonly-assigned patent applications:

application Ser. No. 08/747,415, entitled "METHOD FOR SYNCHRONIZING CLASSES, OBJECTS, ATTRIBUTES AND OBJECT PROPERTIES ACROSS AN OBJECT-ORIENTED SYSTEM," filed on Nov. 12, 1996 U.S. Pat. No. 5,893,913, by Stephen A. Brodsky et al.;

application Ser. No. 08/747,414, entitled "LAYOUT METHOD FOR ARC-DOMINATED LABELLED GRAPHS," filed on Nov. 12, 1996 U.S. Pat. No. 6,011,559, by Dipayan Gangopadhyay et al.;

application Ser. No. 08/747,416, entitled "MULTI-OBJECT VIEWS IN AN OBJECT MODELING TOOL," filed on Nov. 12, 1996 U.S. Pat. No. 5,917,498, by Roni Korenshtein;

application Ser. No. 08/747,057, entitled "INTERACTIVE MODELING AGENT FOR AN OBJECT-ORIENTED SYSTEM," filed on Nov. 12, 1996 U.S. Pat. No. 5,907,706, by Stephen A. Brodsky et al.;

application Ser. No. 08/747,058, entitled "EXECUTION ENGINE IN AN OBJECT MODELING TOOL," filed on Nov. 12, 1996 U.S. Pat. No. 5,983,016, by Stephen A. Brodsky et al.;

application Ser. No. 08/747,417, entitled "NOTIFICATION MANAGER FOR OBJECT-ORIENTED SYSTEMS," filed on Nov. 12, 1996 U.S. Pat. No. 5,991,536, by Stephen A. Brodsky et al.;

all of which applications are incorporated by reference herein.

This application is also related to the following co-pending and commonly-assigned patent applications:

application Ser. No. 08/850,829, entitled "METHOD FOR SYNCHRONIZATION BETWEEN LINKS AND GROUP DEFINITIONS WITHIN AN OBJECT-ORIENTED SYSTEM," filed on same date herewith, by Stephen A. Brodsky et al.;

application Ser. No. 08/850,858, entitled "OBJECT OUTLINE VIEW FOR GROUPS WITHIN AN OBJECT-ORIENTED SYSTEM," filed on same date herewith, by Stephen A. Brodsky et al.;

U.S. Pat. No. 5,895,472, entitled "CHANGE AND ACCOUNTING LOG FOR OBJECT-ORIENTED SYSTEMS," filed on same date herewith, by Stephen A. Brodsky et al.;

U.S. Pat. No. 5,960,199, entitled "MODEL TRACE VIEW FOR OBJECT-ORIENTED SYSTEMS," filed on same date herewith, by Stephen A. Brodsky et al.;

U.S. Pat. No. 6,122,634, entitled "FRACTAL NESTED LAYOUT FOR HIERARCHICAL SYSTEMS," filed on same date herewith, by Stephen A. Brodsky;

application Ser. No. 08/850,847, entitled "REFERENCE ATTRIBUTES WITHIN AN OBJECT-ORIENTED SYSTEM," filed on same date herewith, by Stephen A. Brodsky et al.;

all of which applications are incorporated by reference herein.

BACKGROUND OF THE INVENTION

1. Field of the Invention

This invention relates generally to object-oriented environments, and in particular to a method for sending messages to groups within an object-oriented system.

2. Description of Related Art

In object-oriented systems, there is often a need to send messages to classes and objects within the object-oriented system. Current methods for performing this task are not structured and are often complex. Such complex methods often result in numerous errors and inefficiencies throughout the object-oriented system, and are overly inflexible. What is needed, then, is a straightforward, efficient method for broadcasting messages within an object-oriented system.

SUMMARY OF THE INVENTION

To overcome the limitations in the prior art described above, and to overcome other limitations that will become apparent upon reading and understanding the present specification, the present invention discloses a method, apparatus, and article of manufacture for sending a message to a group where the group then broadcasts the message to its members. The method comprises the steps of creating a first sending object and a group in the memory of a computer, the group being comprised of one or more receiving objects, sending a first message to the first sending object, sending a second message from the first sending object to the group based on a receipt of the first message, and broadcasting the second message to every receiving object in the group.

Various advantages and features of novelty which characterize the invention are pointed out with particularity in the claims annexed hereto and form a part hereof. However, for a better understanding of the invention, its advantages, and the objectives obtained by its use, reference should be made to the drawings which form a further part hereof, and to accompanying descriptive matter, in which there is illustrated and described specific examples in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Hardware Environment

Figure 1:
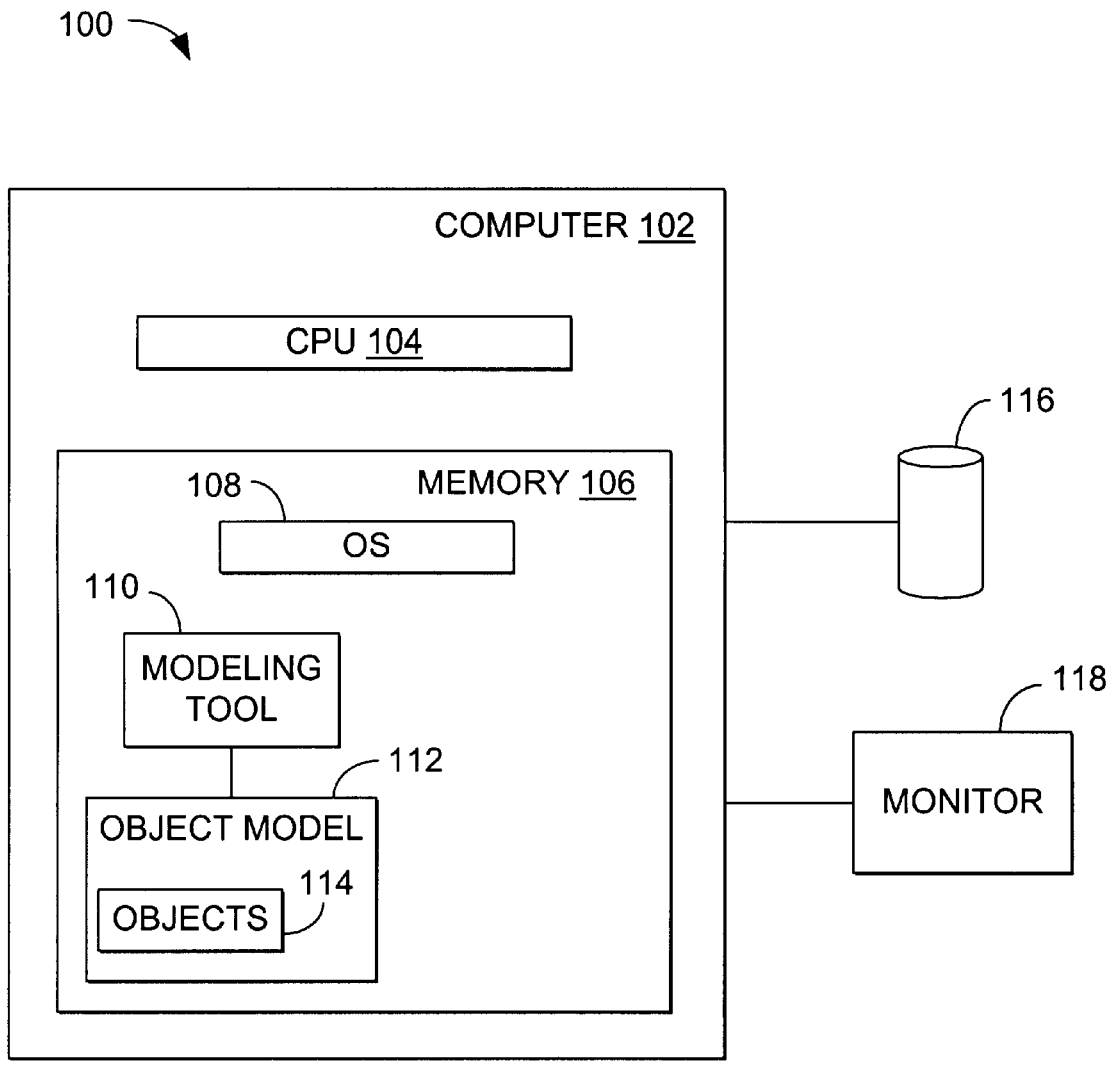
FIG. 1 illustrates an exemplary computer system that could be used to implement the present invention.

FIG. 1 illustrates an exemplary computer system 100 that could be used to implement the present invention. The computer 102 comprises a processor 104 and random access memory (RAM) 106. The computer 102 may be coupled to other devices, such as a monitor, a keyboard, a mouse device, a printer, etc. Of course, those skilled in the art will recognize that any combination of the above components, or any number of different components, peripherals, and other devices, may be used with the computer 102.

Generally, the computer 102 operates under control of an operating system 108 stored in the memory 106. The present invention is preferably implemented using one or more data structures and computer programs operating under the control of the operating system 108. More specifically, the present invention includes an object-oriented modeling tool 110, an object model 112, and various objects 114.

In the preferred embodiment, the operating system 108, the object modeling tool 110, the object model 112, and the objects 114 are all tangibly embodied in a computer-readable medium, e.g., data storage device 116, which could include one or more fixed or removable data storage devices, such as a removable cartridge drive, floppy disc drive, hard drive, CD-ROM drive, tape drive, etc. The computer 102 displays characters, text, and graphics on a monitor 118 which allows a user to view what operations the computer 102 is performing using modeling tool 110. Further, the operating system 108, the object modeling tool 110, the object model 112, and the objects 114 are all comprised of instructions which, when read and executed by the computer 102, cause the computer 102 to perform the steps necessary to implement and/or use the present invention. Of course, those skilled in the art will recognize many modifications may be made to this configuration without departing from the scope of the present invention.

Overview of the Object-oriented System

Figure 2:
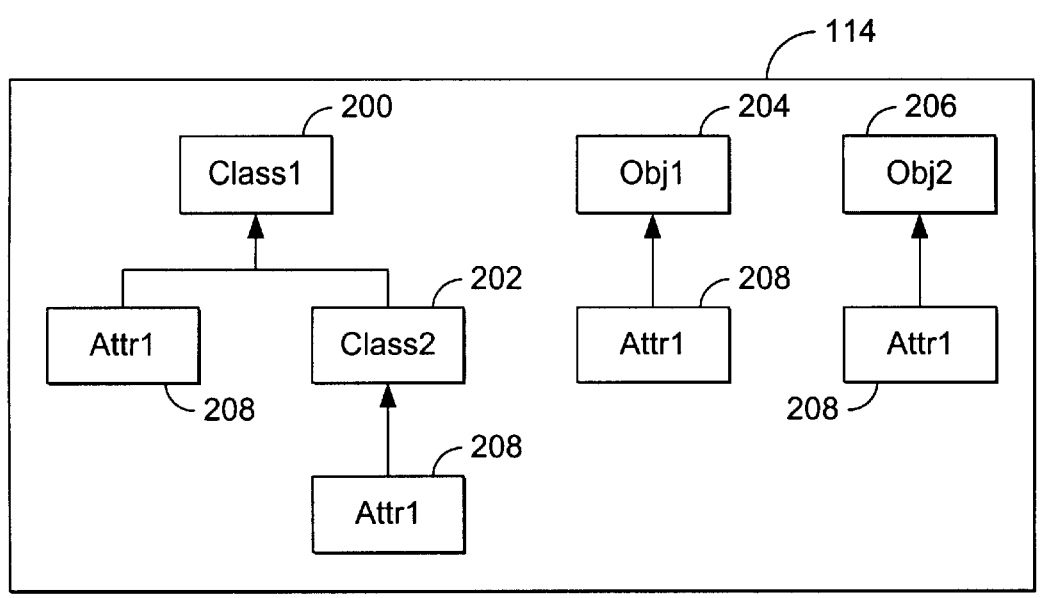
FIG. 2 is a block diagram illustrating the structure of an exemplary object-oriented system according to the present invention.

FIG. 2 is a block diagram illustrating the structure of an exemplary object-oriented system 114 according to the present invention. In the object-oriented system 114, Class2 202 is a subclass of Class1 200. Object1 (Obj1) 204 is an instance of Class1 200 and Object2 (Obj2) 206 is an instance of Class2 202.

Class1 200 and Class2 202 both include Attribute1 (Attr1) 208. Attribute1 208 is synchronized with Object1 204, which is an instance of Class1 200. Attribute1 208 is also synchronized with Object2 206, which is an instance of Class2 202. The attributes are identified as Class1/Attribute1, Class2/Attribute1, Object1/Attribute1, and Object2/Attribute1.

However, Class1 200 and Class2 202 can be related via a link, which can change depending on the relationship of Object1 204 and Object2 206. As the relationship between Object1 204 and Object2 206 changes, the parameters of the link must also change to synchronize the model of the system 114.

The link can be of two different types, depending on whether the link corresponds to a group of objects within a given class, or whether the link corresponds to a group of references to objects within a given class.

A group can have more than one object within the group. Thus, a group construct must define and support a variable that refers to multiple instances of objects. This variable is called multiplicity. To define a group, the multiplicity variable is defined to be unlimited, and designated by a special character, e.g., "*" (asterisk). The group construct must also provide support for the dynamic creation and deletion of objects, and the movement of objects from one group to another.

Once groups and links are created, messages can be sent using the groups as destination points for the messages.

Once a group of objects or references receives a certain message, the group will then send the message to the members of the group, which is called broadcasting the message.

Group Properties

The group construct must provide properties to identify the group, type of group, and limitations on objects that can be members of the group as well as limitations on access to the group. These properties of the group construct are the group name, description, type, member type, and visibility.

Group names are in the same name scope as other things which belong to objects and classes, like attributes. The group descriptions are words or phrases that give a lengthier definition of the group.

There are two types of groups: reference groups and object groups. Object groups have objects as their members; reference groups have references to objects as their members.

The member type allows users to restrict which objects and references can be added to a group. It is typically the name of a class. Only instances of that class or its subclasses can be added to the group. This limitation applies to both reference members and object members.

There are two kinds of members of groups. An object member is physically within the group; if the group is deleted, the object is deleted also. A reference member contains a reference to an object that exists outside the group. If the group is deleted, the object remains.

If a member of a group is an object, the path name of the object is the path name of the group +"/"+ the name of the object, e.g., "Person/Person1." If the member of a group is a reference, the path name of the object is not changed. There cannot be two object members in a group with the same name.

The visibility of a group is either public or private. The visibility of a group does not affect the visibility of constructs belonging to group members. It affects whether other objects can access the group members and add or delete members from the group.

An object can be a reference member of more than one group, but it can be an object member of only one group. An object member of a public object group can be a reference member of other groups. If the object group is private, the object members cannot be reference members of other groups.

If an object is deleted, corresponding reference members are deleted. The interrelationship between groups and type is that a reference group cannot contain object members and an object group cannot contain reference members.

Once the group is defined, messages can be sent to the group. A message is sent to the group by using the group name as the target of the message, e.g., the programming statement "people.doit( )" would send the message "doit" to the group "people." When the group receives the message, it will be forwarded to each member of the group. This is true for both object groups and reference groups.

Containment Group Example

Figure 3A:
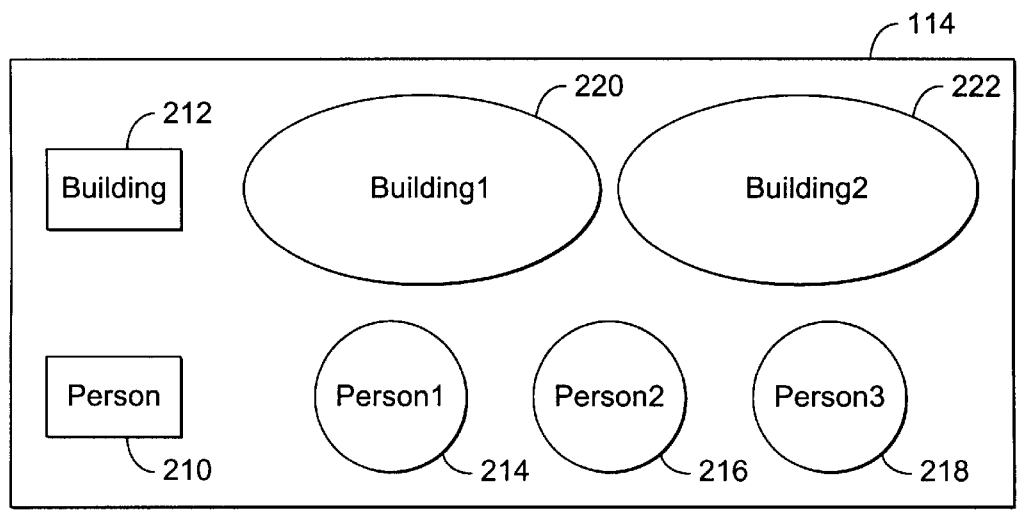
FIGS. 3A–3F illustrate the creation and display of containment groups and containment links.

FIG. 3A illustrates a containment link structure as practiced by the present invention.

An object-oriented programming language user should be able to model the fact that people are inside buildings, they can move from one building to another, and people may not be in a building.

To model this system, a user would create a Person Class 210 and a Building Class 212 inside of the object-oriented system 114. Person Class 210 would have several objects, e.g., Person1 214, Person2 216, and Person3 218. Building Class 212 would also have several objects, e.g., Building1 220 and Building2 222.

Some of the objects in Person Class 210 are in buildings, and some of the objects in Person Class 210 are not. Further, any given object within Person Class 210 cannot be in more than one building at any given time.

Figure 3B:
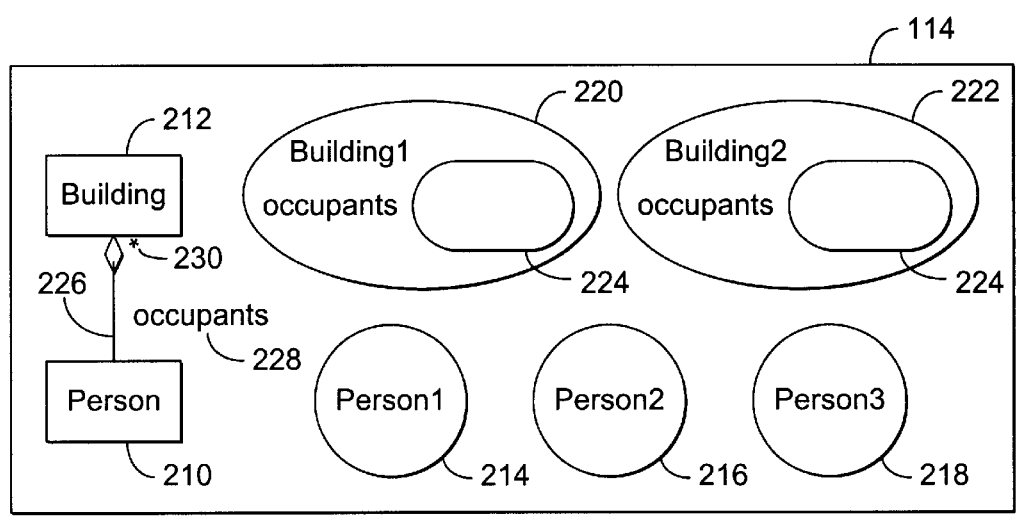

FIG. 3B shows the creation of a containment group and containment link by the present invention.

The present invention allows for a group 224, otherwise known as a containment group, to collect and synchronize all of the objects within Person Class 210 that are in Building1 220. Once group 228 is created, a link 226 is created between person class 210 and building class 212. Person1 214, person2 216, and person3 218 can move in and out of group 224 depending on whether Person1 214 and Person2 216 move from Building1 220. Changing the number of objects within Person Class 210 that are associated with an object building does not change the definition of Building Class 212. Group 224 is given a name 228, occupants, and a multiplicity value 230. To specify a containment group, multiplicity value 230 must be unlimited, denoted by an asterisk.

Figure 3C:
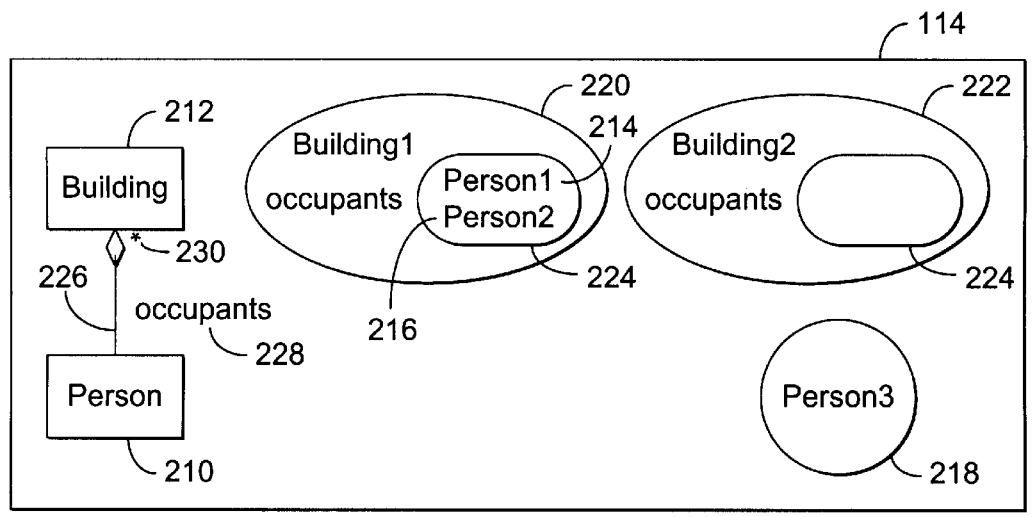

FIG. 3C illustrates changing the objects within a containment group.

Person1 214 and person2 216 can move from outside building1 220 to inside building 1 220. When person1 and person2 do this, they will be members of group 224 within the instance building1 220 of building class 212. Group 224 associated with instance building2 222 is still empty, since no member of person class 210 is in building2 222.

Figure 3D:
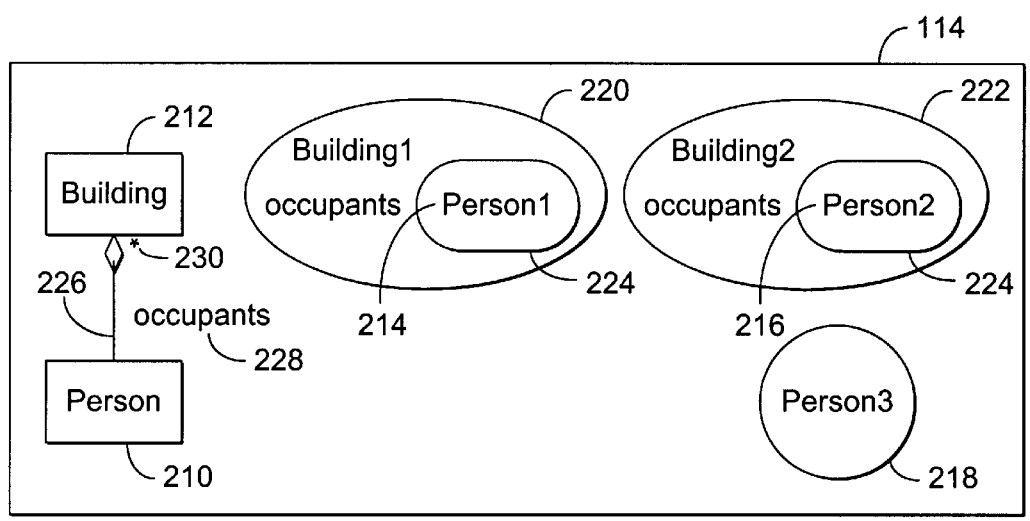

FIG. 3D illustrates moving objects between containment groups.

As Person2 216 leaves building1 220 and enters Building2 222, Person2 214 moves from group 224 associated with instance building1 220 to group 224 associated with instance building2 222.

Figure 3E:
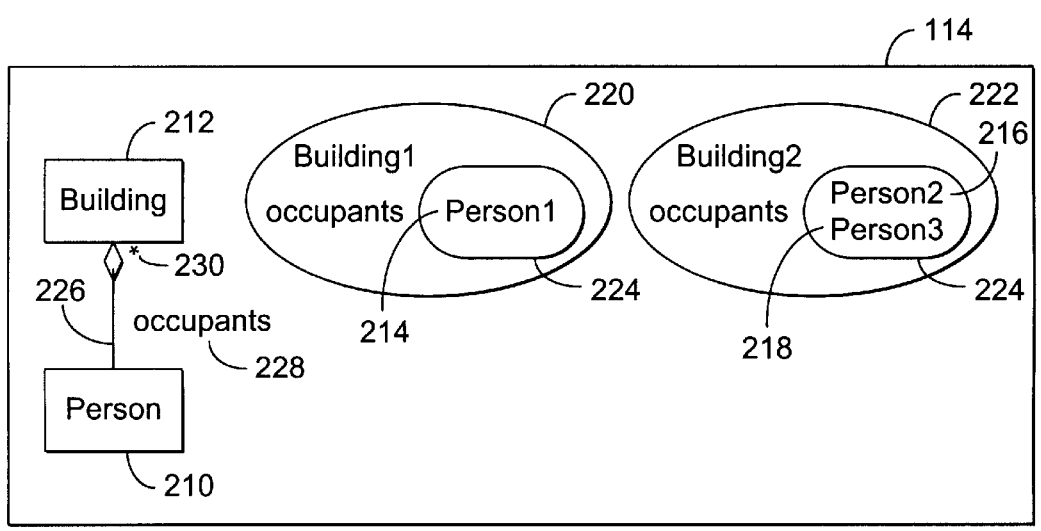

FIG. 3E illustrates moving objects between containment groups.

As Person3 218 joins person2 216 in Building2 222, Person3 218 moves into group 224 associated with instance building2 222.

Figure 3F:
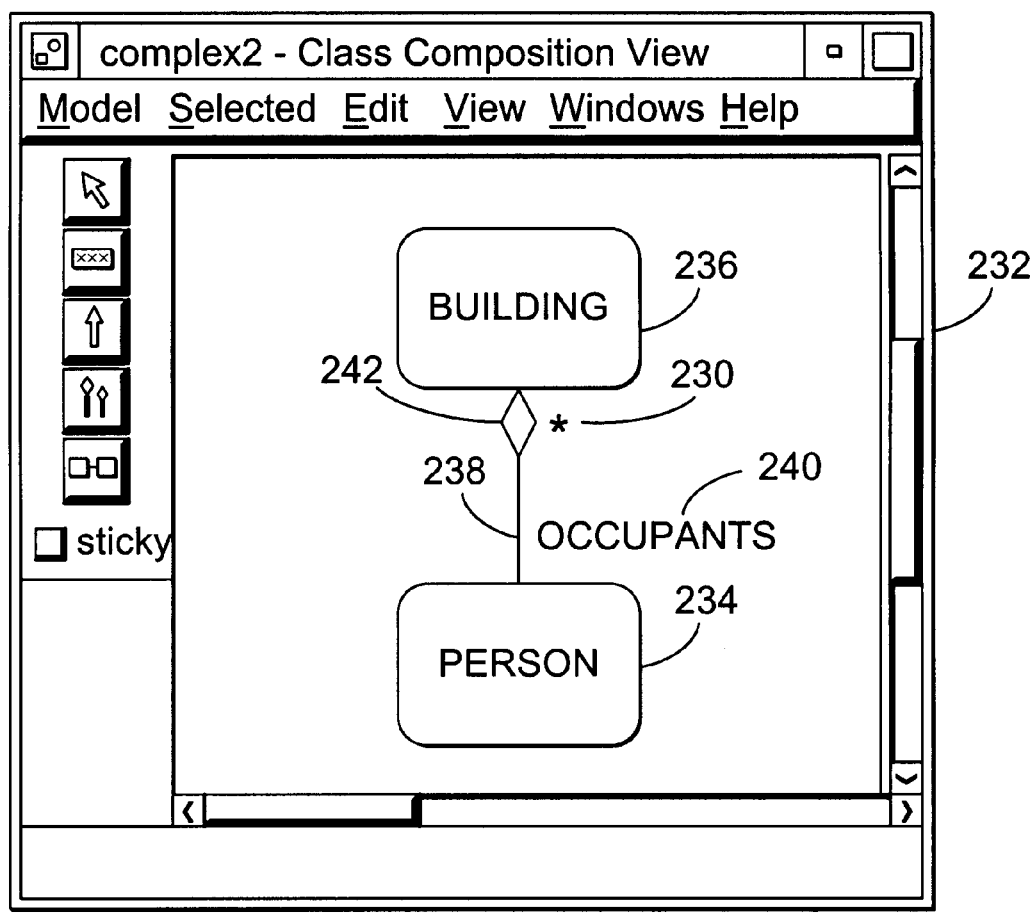

FIG. 3F illustrates a typical view of containment links and containment groups on the display of a computer.

Window 232 is a class composition view (CCV) window that is typically displayed on the monitor of the computer to show the user the containment links for a given model. Person class 210 is represented by icon 234 and building class 212 is represented by icon 236. Containment link 226 is represented by link 238, and link 238 shows that icon 234 and icon 236 are coupled together. The name 240 of containment link 226 is listed with the link 238, e.g., "occupants." Further, multiplicity value 230 is listed with the link, e.g., "*."

The diamond shaped head 242 of link 238 indicates that person class 210 is contained within building class 212.

Association Group Example

Figure 4A:
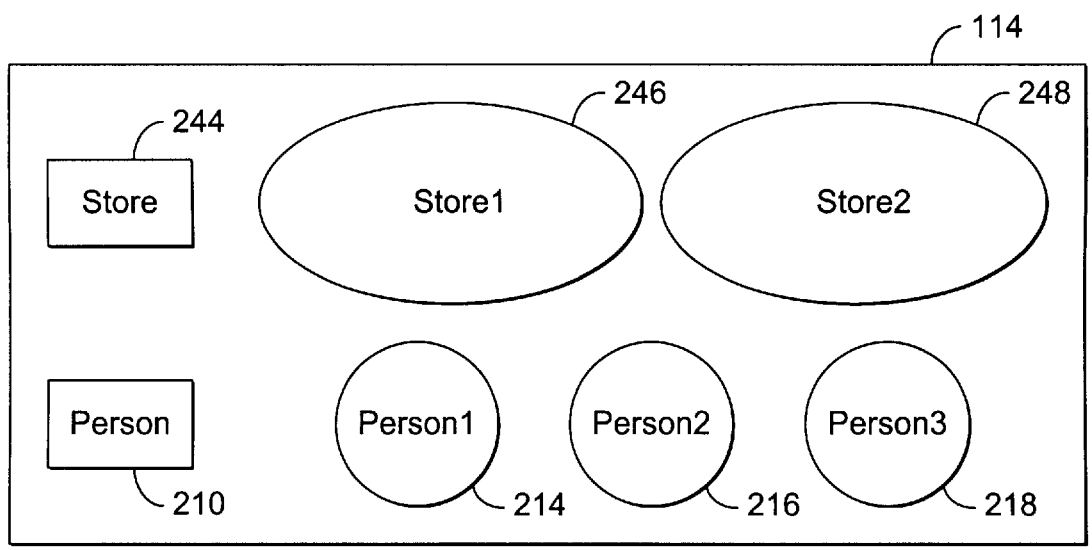
FIGS. 4A–4F illustrate the creation and display of association groups and reference links.

FIG. 4A illustrates an association link structure as practiced by the present invention.

Person Class 210 again contains objects Person1 214, Person2 216, and Person3 218. Objects in the Person Class 210 shop at stores in the Store Class 244, Store1 246 and Store2 248 being objects within Store Class 244. Each Store groups the customers by whether they shop at that store or not.

Figure 4B:
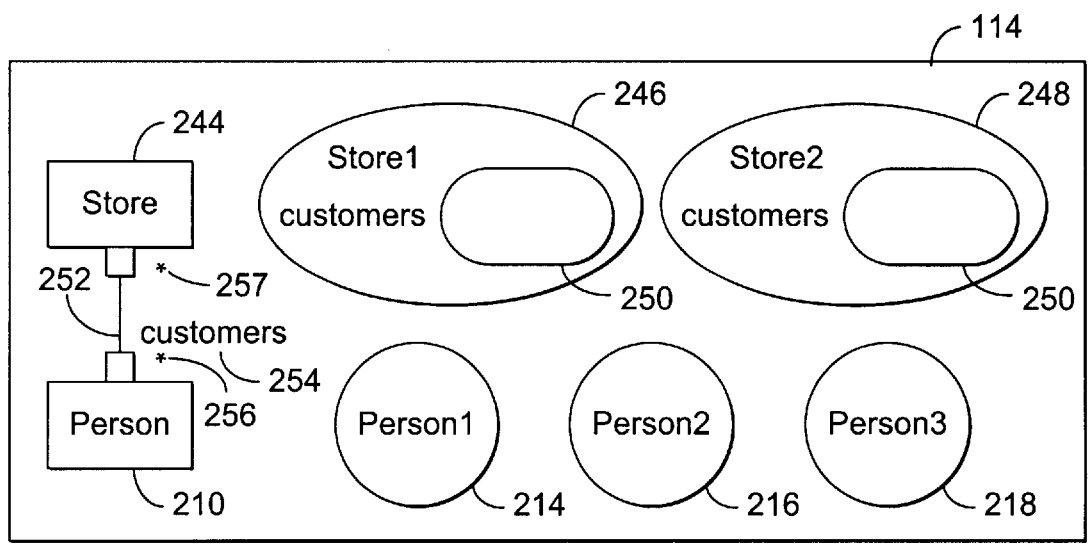

FIG. 4B shows the creation of an association link and an association group in the present invention.

FIG. 4B shows the creation of a group 250 within store class 244. To illustrate this group 250, called an association group, a link 252 is created between person class 210 and store class 244. Link 252 has an associated name 254 and two associated multiplicity values 256 and 257. To create an association link, the multiplicity values 256 and 257 must be unlimited, denoted by an asterisk. The group 250 is initially empty upon creation.

Figure 4C:
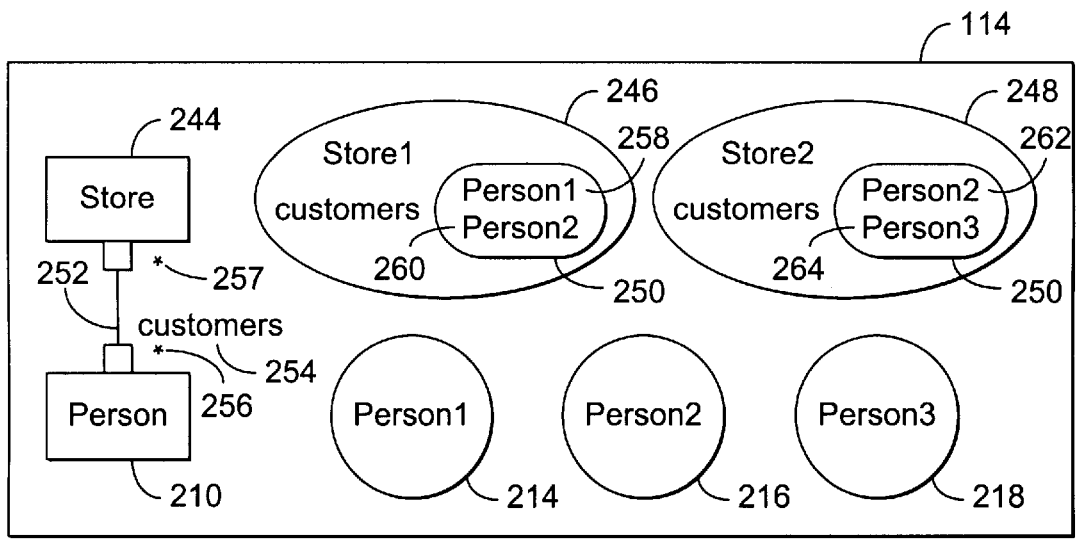

FIG. 4C shows changing the members within the association group of the present invention.

FIG. 4C shows adding reference members corresponding to the instances of the person class 210 that will be members of group 250. Reference member 258 shows that person1 214 shops at store1 246. Reference member 260 shows that person2 216 also shops at store1 246. Reference member 262 shows that person2 216 shops at store2 248, and reference member 264 shows that person3 218 shops at store2 248. Thus, the reference members 258–264 are placed in group 250 to show the relationships between person class 210 and store class 244. The objects 214–218 are not physically contained within group 250. Further, one object, e.g., person2 216, can be in both group 250 associated with store1 246 and group 250 associated with store2 248.

Figure 4D:
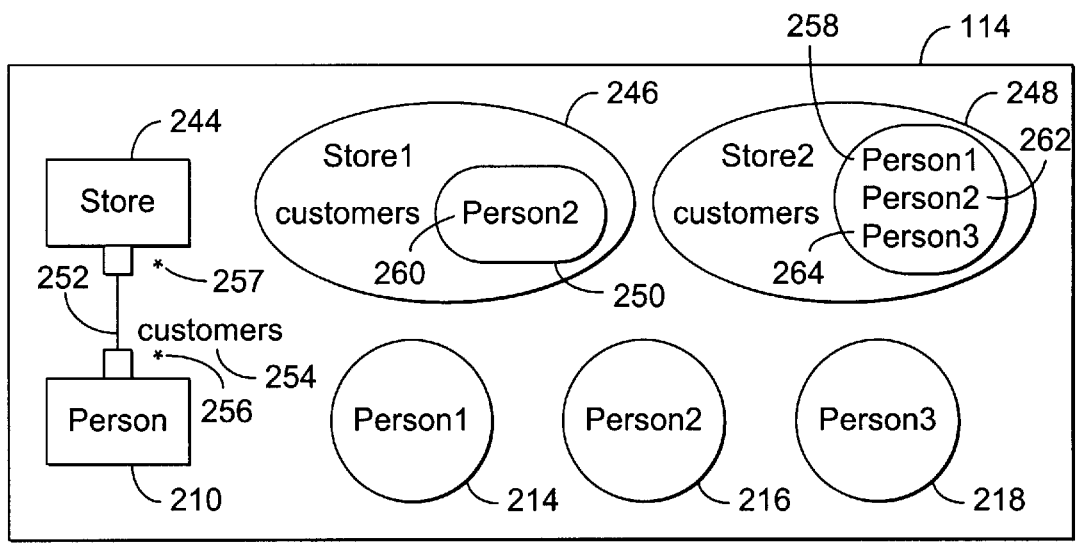

FIG. 4D shows moving a reference to an association group.

If person1 214 stops shopping at store1 246, and starts shopping at store2 248, reference member 258 is moved from group 250 associated with store1 246 to group 250 associated with store2 248 to illustrate the change in association between person class 210 and store class 244.

Figure 4E:
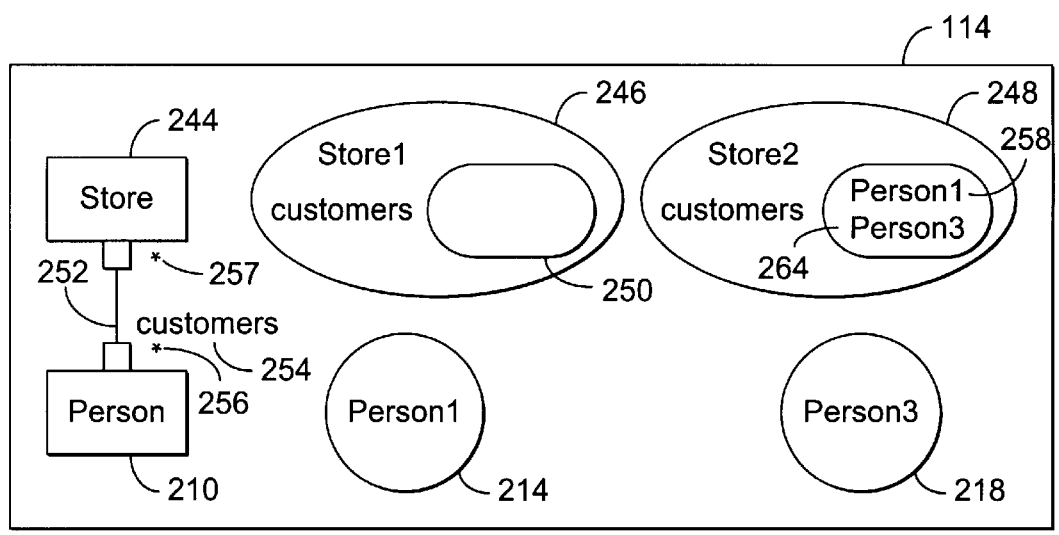

FIG. 4E shows deleting an object from a class in the present invention.

If person2 216 moves away from the area, person2 216 can no longer shop at store1 246 and store2 248. In this scenario, person2 216 will be deleted from the model in the memory 114, and the reference members that represent person2 216, e.g., reference members 260 and 262, will be correspondingly deleted from group 250 associated with store1 246 and group 250 associated with store2 248.

Figure 4F:
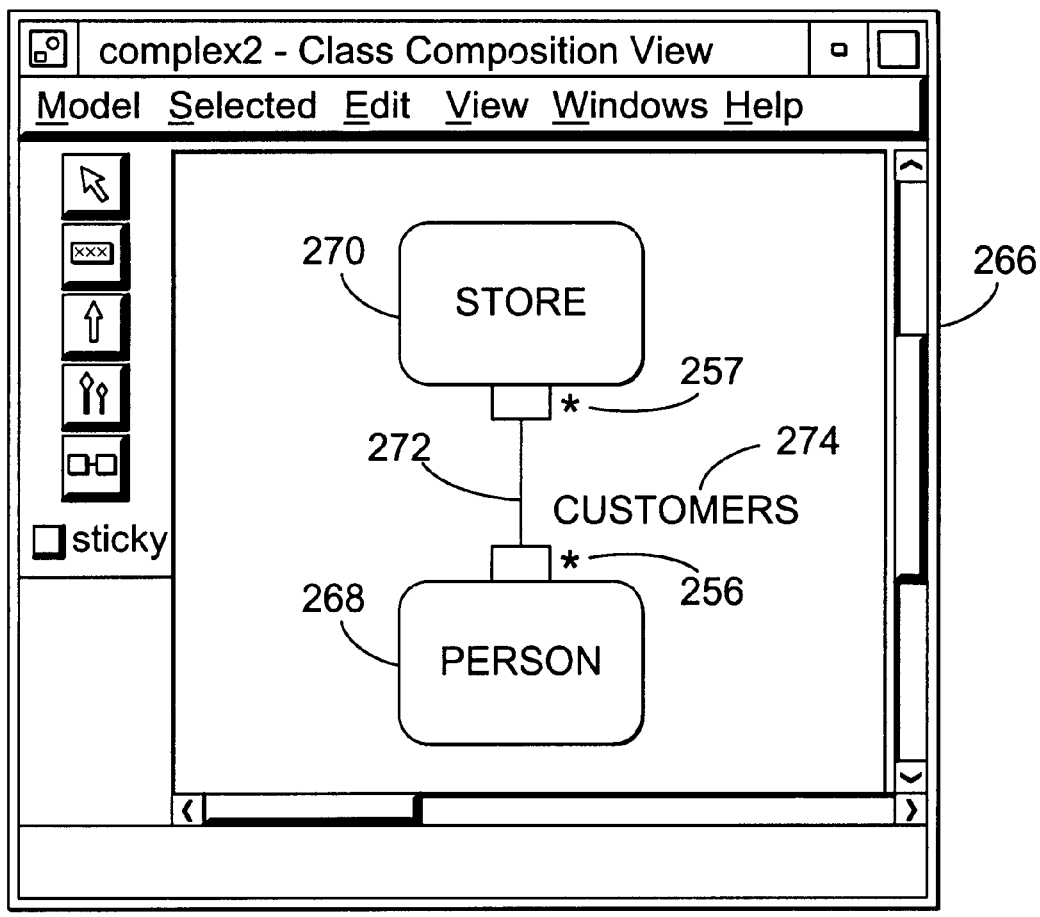

FIG. 4F illustrates a typical view of association groups and association links on the display of a computer.

Window 266 is a typical CCV window that is displayed on the monitor 118 of the computer 102. Window 266 shows person class icon 268 representing person class 210 and store class icon 270 representing store class 244 connected by association link 272. Association link 272 is shown with a link name 274, e.g., "customers." Association link 272 is also shown with multiplicity values 256 and 257, to show the multiplicity values of the roles for each end of the association link 272.

Containment Group and Containment Link Description

Figure 5:
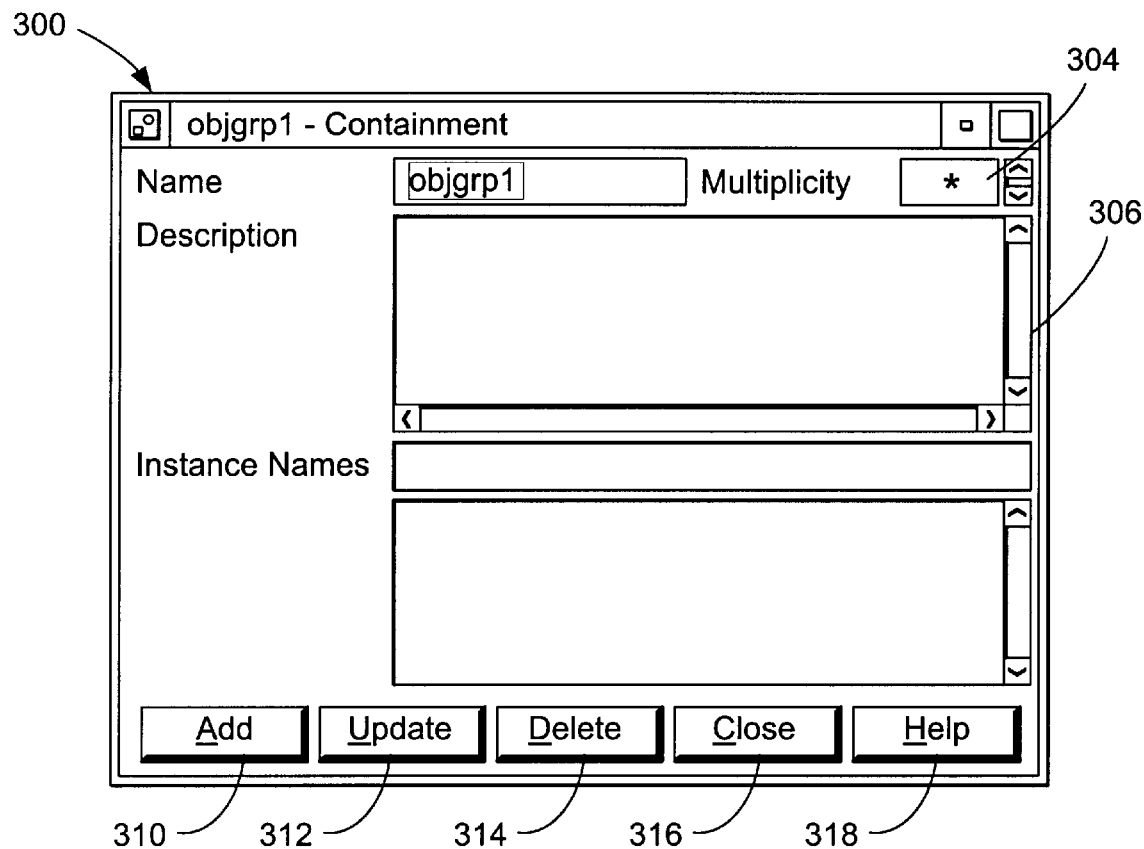
FIG. 5 illustrates a window used to create containment links and containment groups as used in the present invention.

FIG. 5 illustrates a window used to specify containment links and containment groups as used in the present invention.

To specify a containment group of objects within an object-oriented model, the containment group of objects must be specified such that the computer that is running a given object-oriented model is able to use the information about the containment group.

As shown in FIG. 5, window 300 is displayed on the monitor of a computer to assist the programmer or used in specifying a containment group. For containment groups name 302, if the multiplicity value 304 is unlimited, denoted by an asterisk, then containment groups with the name specified in name field 302 are added to instances of the container class. A description of the containment group is described in description field 306.

The window 300 also contains pushbuttons 310–318 which allow the user to update or delete a given containment link or group, close the window 300, or request online help. Buttons 310 and 314 are disabled for containment groups.

Association Group and Association Link Description

Figure 6:
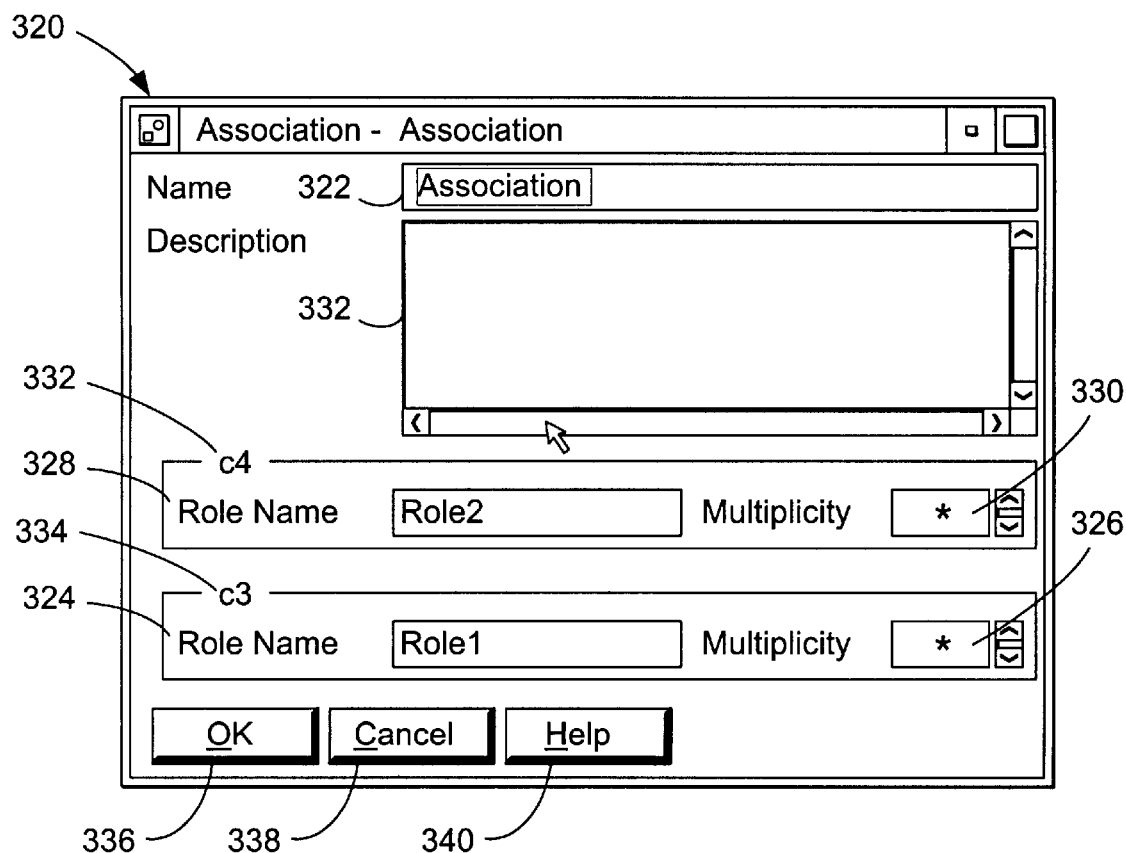
FIG. 6 illustrates a window used to create association links and reference groups as used in the present invention.

FIG. 6 illustrates a window used to create association links and association groups as used in the present invention.

As shown in FIG. 6, window 320 is displayed on the monitor of a computer to assist the programmer or user in creation of the containment group. The name 322 is used to specify the association link, along with role1 324 with multiplicity value 326, and role2 328 with multiplicity value 330.

Name 322 allows the user to give a unique name to the association link or association group. Description 332 provides a description of the association link.

When multiplicity value 330 is specified as unlimited, then the value of the role name field 328 is the name of an association group. When multiplicity value 326 is specified as unlimited, then the value of the role name field 324 is the name of another association group. Class name 332 is the class in which the association group named in role name 328 exists. Class name 334 is the class in which the association group named in role name 324 exists. The names of the classes 332 and 334 cannot be changed in window 320.

Pushbuttons 336–340 are provided for the user to verify the correctness of the information in the window 320, cancel the creation of the association link or association group, or to request online help.

Figure 7:
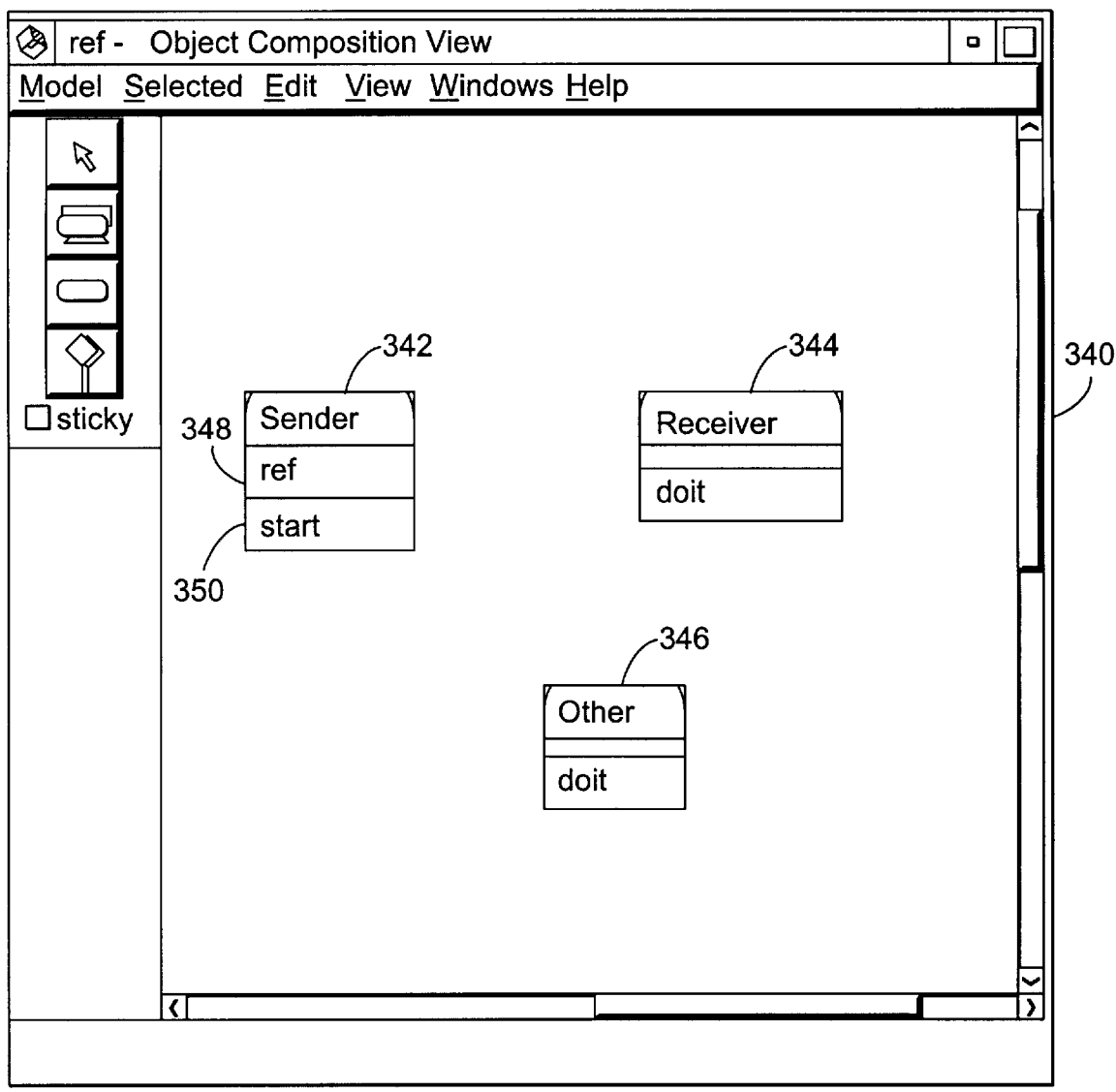
FIG. 7 illustrates a typical window showing a model construct in an object-oriented modeling environment.

FIG. 7 illustrates a typical window showing a model construct in an object-oriented modeling environment.

Window 340 is a typical Object Composition View (OCV) window used to create objects in the system 114. The window 340 shown has three objects already created: object Sender 342, object Receiver 344, and object Other 346. The names of objects 342–346 are shown in the uppermost part of the icons within window 340.

In the present example, the user would like to program Object Sender 342 to send a message, e.g., "doit( )," to object Receiver 344, but not to object Other 346.

Multiple messages can also be sent to one object, one group of objects, or one list of objects, depending on the requirements of the model. Each message can be sent as an ordered or non-ordered sequence of messages, wherein an ordered sequence comprises a list of messages where the first message is received by all members of the group before the second message is sent by the sending member or object. Further, the message can be sent without having an initial sending object, thus broadcasting the message directly to a group.

To send the message, object Sender 342 is given a property called a reference attribute 348, which is given a title, e.g., "ref." Reference attribute 348 contains the name of the object that doit( ) should be sent to, e.g., "/Receiver" to designate object Receiver 344 as the recipient of the message. Reference attribute 348 can be given multiple values, such as "/Receiver, /Other" to indicate that more than one object within system 114 is to receive the message. Further, reference attribute 348 can use a nesting structure to designate an object or sub-object within another object by specifying the path name of the desired object in the reference attribute 348. Further, reference attribute 348 can be given a name of a group, either a containment group or an association group, as its value to specify where the message needs to be sent.

Window 340 shows the objects 342–346 in a 3-pane view style. The top pane contains the object name, the second pane, e.g., reference attribute 348, lists the attributes associated with the object, and the third pane lists the operations, also known as methods and events, associated with the object, which are the messages an object can receive. As shown in FIG. 7, object Sender 342 has a name, "Sender" in the top pane, reference attribute 348 named "ref" in the second pane, and event 350 named "start" in the third pane.

Figure 8:
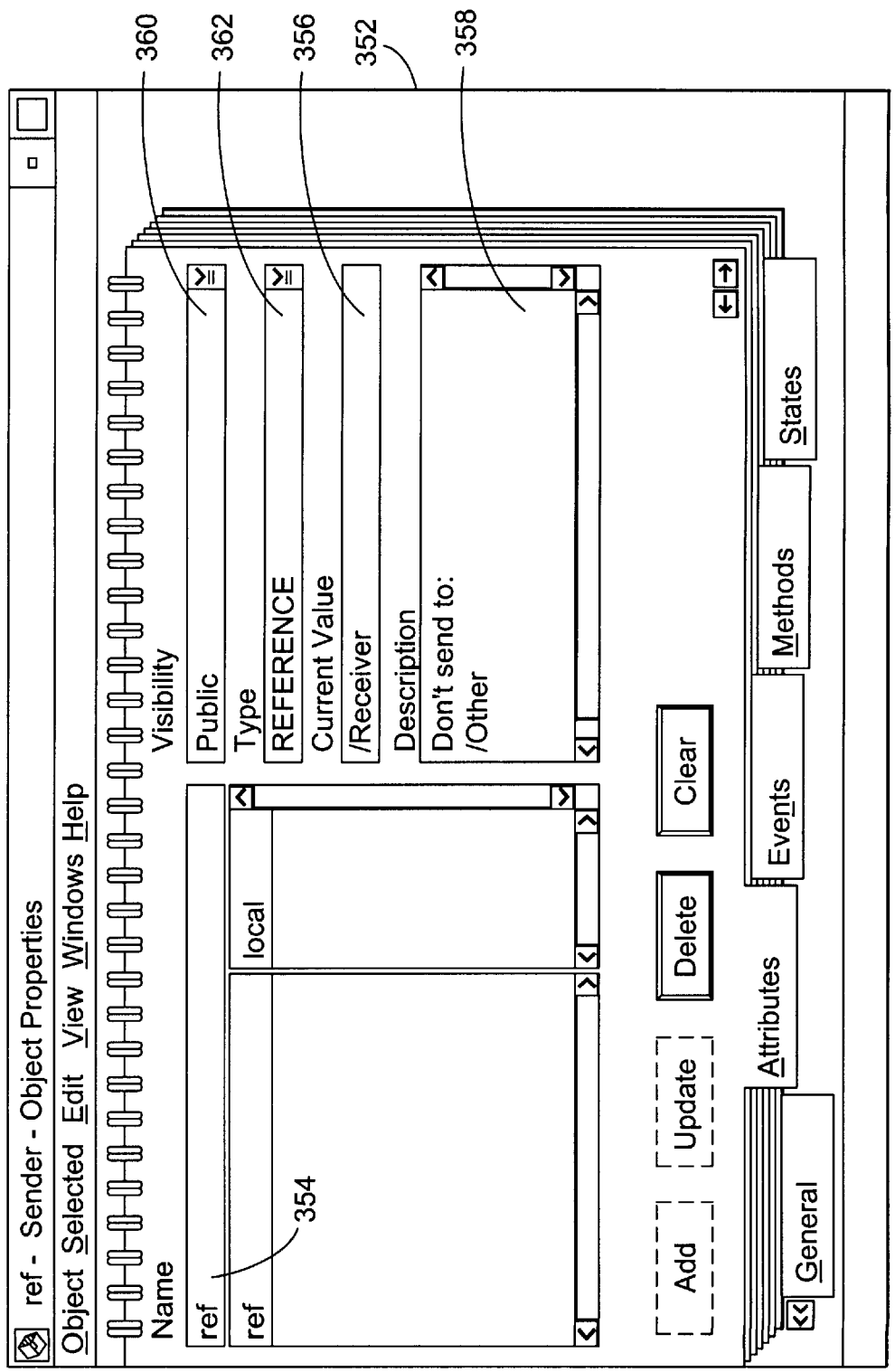
FIG. 8 shows detailed information about the reference attributes of the present invention.

FIG. 8 shows detailed information about the reference attributes of the present invention.

To expand on the reference attribute 348 named "ref," window 352 can be opened by the user to enter information regarding the reference attribute 348. A name field 354 is displayed to allow the user to define the name, e.g., "ref," of the reference attribute 348.

The current value field 356 lists the destination for the message, in this case, object Receiver 344, listed in path name format e.g., "/Receiver." The current value field can also be the name of an association group or containment group to designate all of the members of the group specified to receive the message.

The description field 358 allows the user to place comments or other descriptive language for ease of use of the reference attribute. In this case, the description field 358 contains a comment that the message will not be sent to object Other 346.

The visibility field 360 can be either public or private. If the visibility field 360 is private, then only objects within the same class can receive the message via the reference attribute 348. If the visibility field 360 is public, then any object can receive the message via the reference attribute 348.

The type field 362 allows the user to choose the type of property associated with the attribute of the object. The present invention allows the user to select a value for the type field 362 that makes the attribute a reference attribute, and in FIG. 4 the type field 362 contains the type "REFERENCE" to designate this property of the attribute as a reference attribute.

Figure 9:
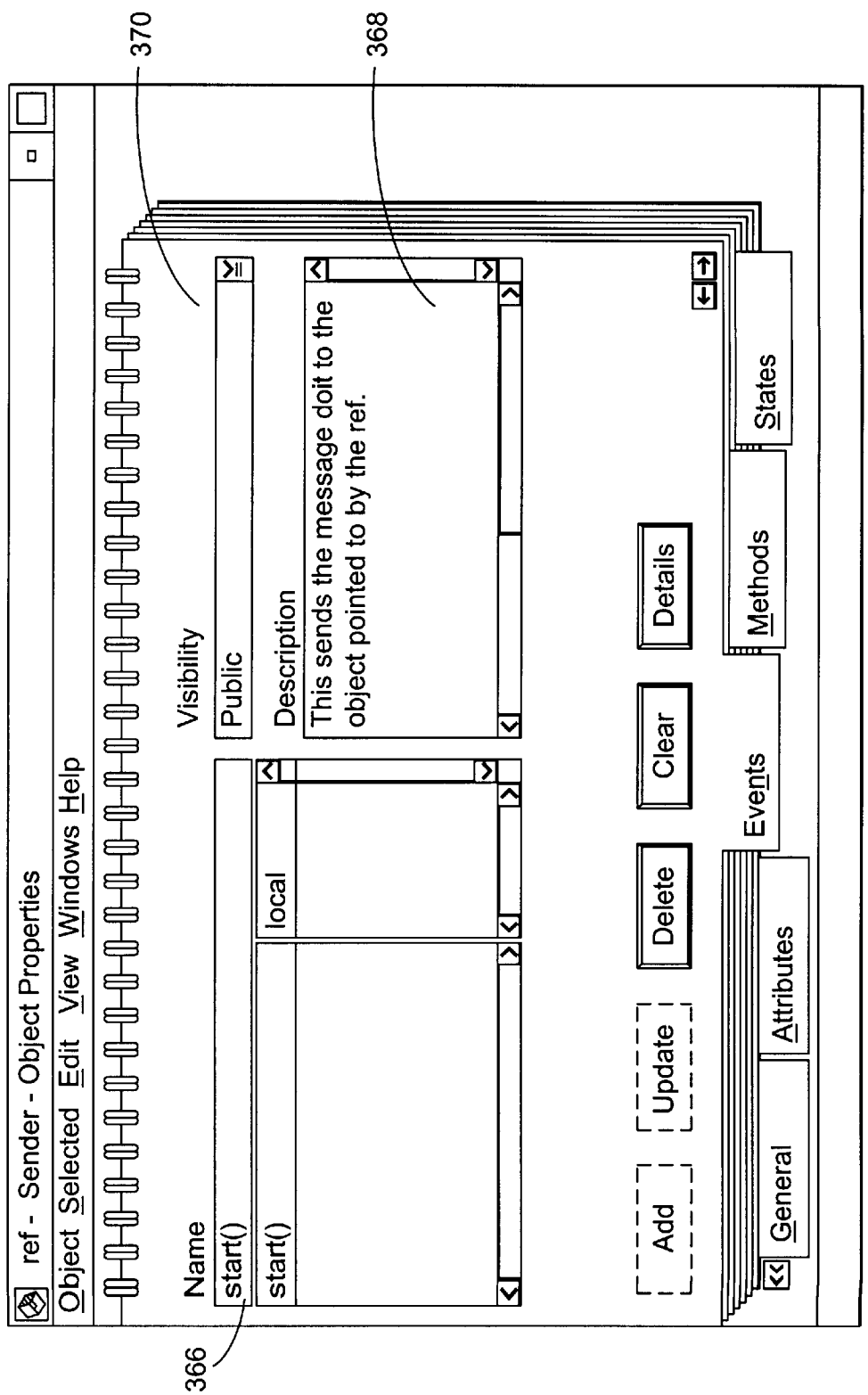
FIG. 9 illustrates an event description window as used in the present invention.

FIG. 9 illustrates an event description window as used in the present invention.

Window 364 illustrates an event window that describes a message to be sent to the named object for that reference attribute 348. As shown in FIG. 9, name field 366 contains the name of the event, e.g., "start( )." Note that the name of the event is also listed in event pane 350 of window 340 illustrated in FIG. 7.

A description field 368 is provided in window 364 to describe the actions that will be taken once the event named in name field 366 takes place. A visibility field 370 is also provided.

Figure 10:
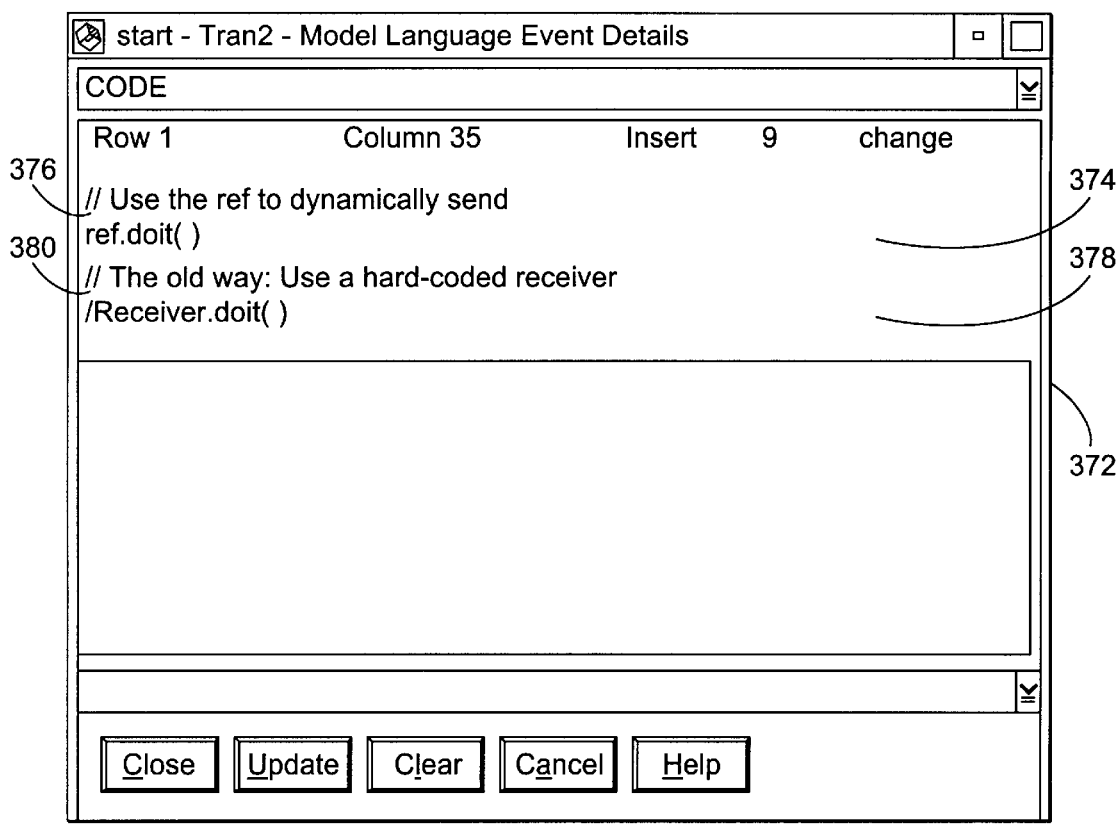
FIG. 10 shows a window which gives additional details on an event in the present invention.

FIG. 10 shows a window 372 which gives additional details on an event in the present invention.

Line 374 is a comment line to describe command line 376. Command line 376 shows a command, ref.doit( ), which is dynamically sent from object Sender 342 upon receiving the event start( ).

In addition, the present invention also allows for the direct sending of a message to a group without the use of reference attributes. This is accomplished by hard coding a group name in place of object receiver as shown in line 380, which avoids the use of reference attributes to send the message. The user could also select a group name from the starting objects/operations/arguments list as an initial destination for the first message in the run of the model, and thus, the initial message does not have to emanate from an object.

Figure 11:
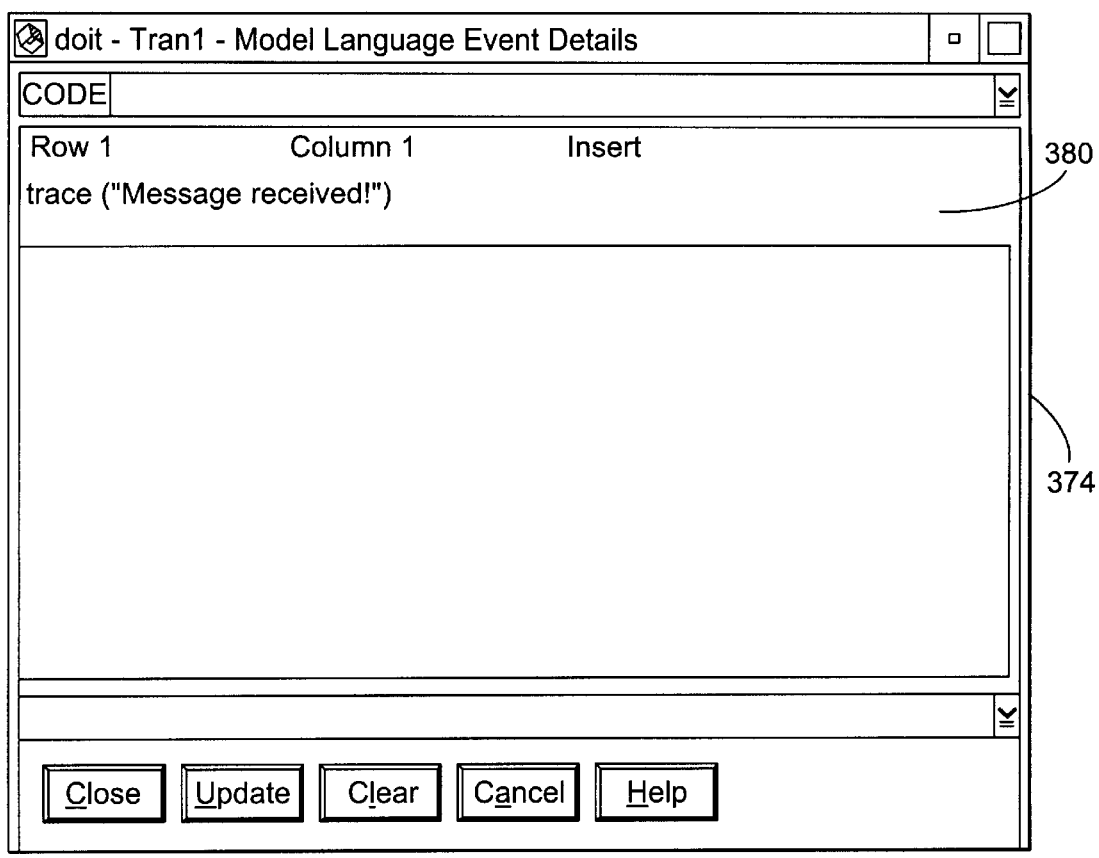
FIG. 11 illustrates a window which gives additional details on an event in the present invention.

FIG. 11 illustrates a window which gives additional details on an event in the present invention.

Window 374 as shown in FIG. 11 shows the body of code which will be run when the event "doit," which is associated with object Receiver 344, is received. Line 380 is a trace, also known as a print statement, which is run when doit( ) is executed. The appearance of the output of this statement in the model trace view window, which is described in commonly assigned patent application entitled "MODEL TRACE VIEW FOR OBJECT-ORIENTED SYSTEMS" and filed simultaneously herewith, confirms that the statement was run during model execution.

Figure 12:
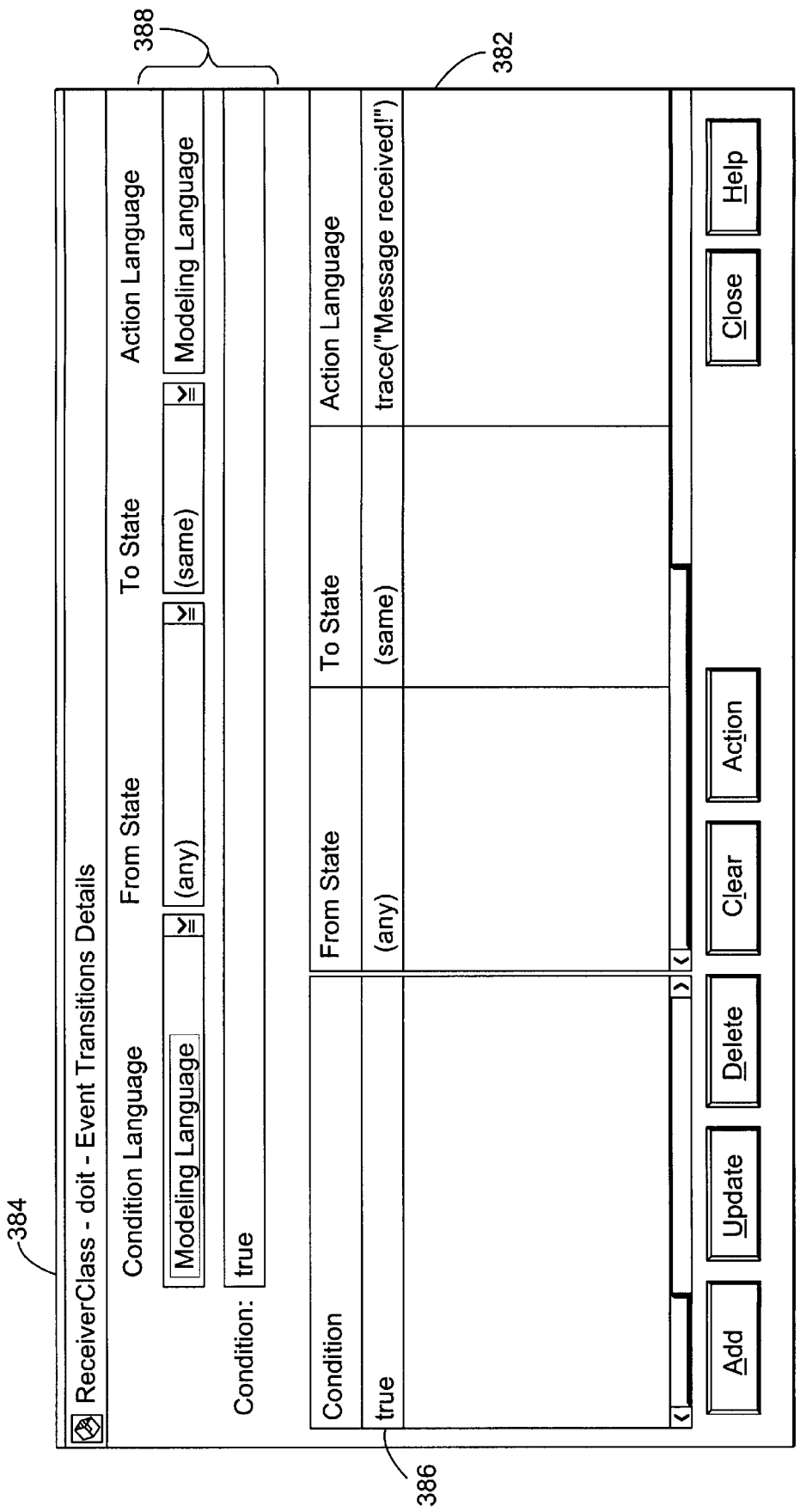
FIG. 12 illustrates a window which gives additional details on event transitions in the present invention.

FIG. 12 illustrates a window which gives additional details on event transitions in the present invention. Window 382 is associated with object Receiver 344 and event "doit" based on the title block 384.

Transition line 386 shows the conditions, beginning and ending states, and programmed actions taken for the object and message in question. The first line of the programmed action of FIG. 11 is displayed in the far right column of transition line 386 as shown in FIG. 12, e.g., "trace ("Message received!"). The user can alternate between the window 374 of FIG. 11 and window 382 of FIG. 12 to see additional programming actions for a given condition specified in transition line 386 as shown in FIG. 12. The condition and states can be modified by the user in the update block 388. Multiple such transition lines 386 can exist for a given event.

Figure 13:
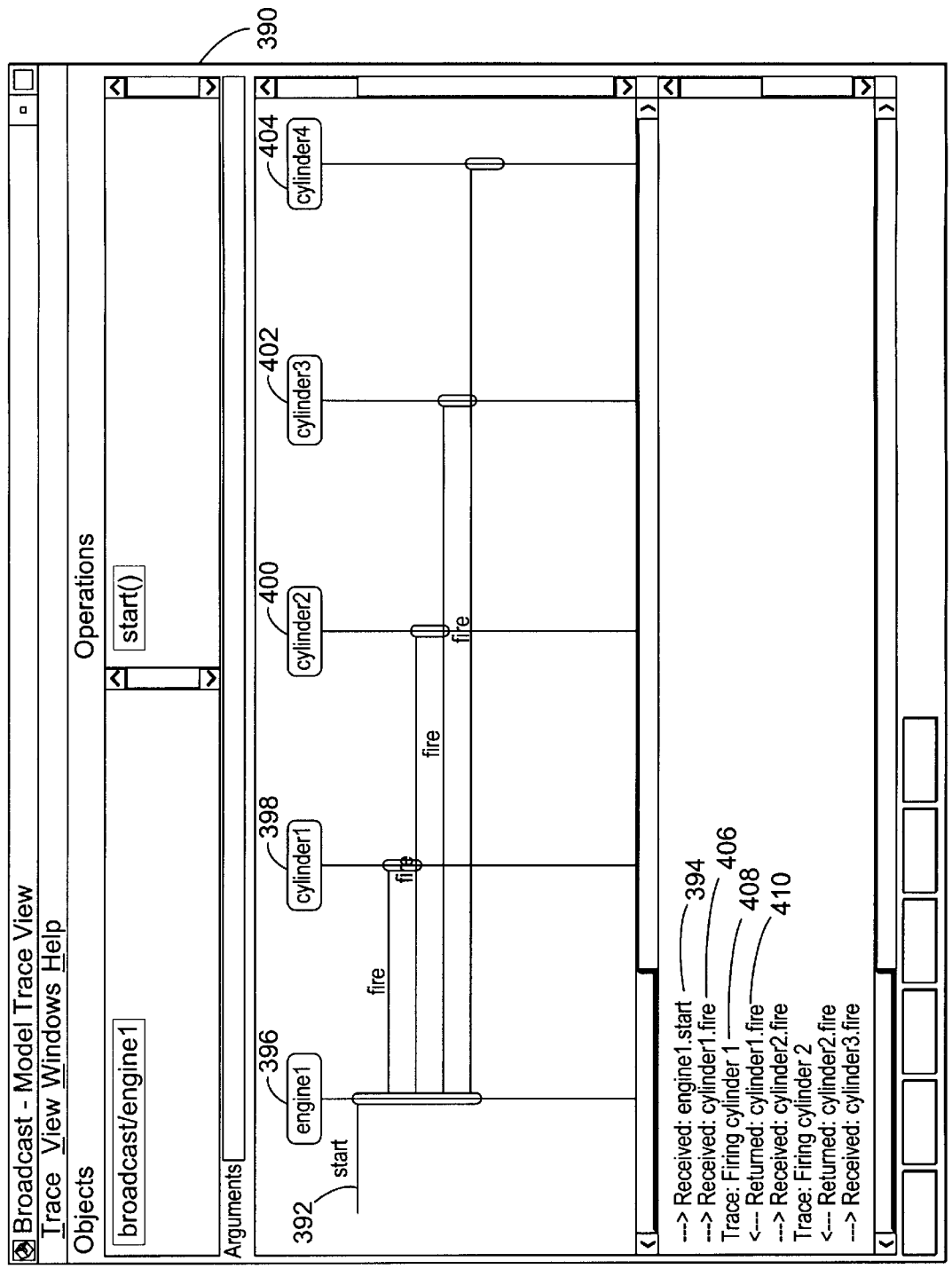
FIG. 13 illustrates a model trace view example of the present invention.

FIG. 13 illustrates a model trace view example of the present invention.

Window 390 illustrates an example of the present invention. The system that the present invention models in window 390 is an engine of a vehicle, where the engine has four cylinders. Once the engine receives a start command, such as turning an ignition key, the engine will fire the cylinders one, two, three, and four. It is possible to have the messages sent in an ordered fashion if desired.

The receipt of an event 392 is shown graphically in window 390. The programming line 394 corresponds to event 392. Event 392 and programming line 394 are illustrative of a first message that is sent to an object, in this case, engine1 396.

Once engine1 396 receives the message, cylinder1 398, cylinder2 400, cylinder3 402, and cylinder4 404 must be told to fire. Thus, engine1 396 broadcasts a second message, namely the message fire, to each member of the group of cylinders contained within the group "cylinder," of which cylinder1 398, cylinder2 400, cylinder3 402, and cylinder4 404 are members.

Line 406 shows that cylinder1 398 received the message "cylinder1 fire" and line 408 shows that cylinder1 398 actually did fire. Line 410 shows a return of a message to engine1 386. Similar responses for cylinder2 400, cylinder3 402, and cylinder4 404 appear in the window 390.

Similarly, the messages 394, 406, 408, and 410 can be sent during engine operations without receiving a message to the object engine1 396, thus, the message "fire" would be sent directly to the group "cylinder" instead of emanating from the object engine1 396.

Figure 14:
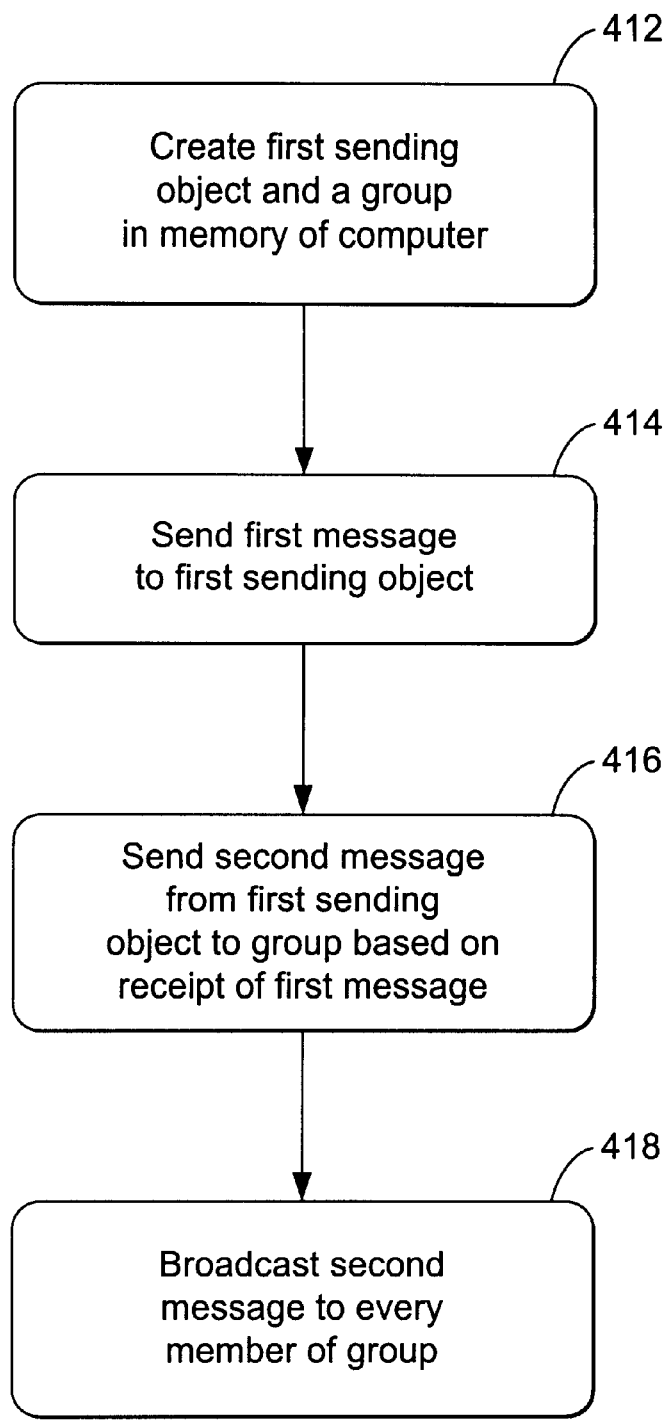
FIG. 14 illustrates the steps performed in practicing the present invention.

FIG. 14 illustrates the steps performed in practicing the present invention.

Block 412 illustrates the step of creating a first sending object and a group in a memory of a computer, the group being comprised of one or more receiving objects.

Block 414 illustrates the step of sending a first message to the first sending object.

Block 416 illustrates the step of sending a second message from the first sending object to the group based on the receipt of the first message.

Block 418 illustrates the step of broadcasting the second message to every receiving object in the group.

CONCLUSION

This concludes the description of the preferred embodiment of the invention. The present invention discloses a method, apparatus, and article of manufacture for sending a message to a group of objects and having the message broadcast to its members. The method comprises the steps of creating a first sending object and a group in a memory of a computer, the group being comprised of one or more receiving objects, sending a first message to the first sending object, sending a second message from the first sending object to the group based on the receipt of the first message, and broadcasting the second message to every object in the group.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computerized method for broadcasting a message within an object-oriented modeling system, comprising:
   (a) creating a first sending object in an object model;
   (b) creating a group in the object model said creating comprising:
      (1) specifying a class for the group; and
      (2) specifying at least one receiving object for said group in the object model, wherein the receiving object is from a collection consisting of an instance of the class or an instance of a subclass of the class;
   (c) sending a first message to the first sending object;
   (d) sending a second message from the first sending object to the group based on the receipt of the first message; and
   (e) broadcasting the second message to every receiving object in the group.

2. The method of claim 1, wherein each receiving object in the group behaves according to the forwarded message.

3. The method of claim 1, wherein the broadcasting works for objects and references.

4. The method of claim 1 wherein the creating further comprises specifying a multiplicity.

5. The method of claim 1 wherein the sending a second message comprises sending the second message using a name of the class for the group.

6. The method of claim 1 wherein the class for the group maintains the ability to:
   add an object to the group; and
   delete an object from the group.

7. A computerized apparatus for broadcasting a message within an object-oriented modeling system, comprising:
   (a) a computer having a memory;
   (b) means, performed by the computer, for creating a first sending object in an object model;
   (c) means, performed by the computer for creating a group in the object model, the means for creating comprising:
      (1) means for specifying a class for the group; and
      (2) means for specifying at least one receiving object for said group in the object model, wherein the one or more receiving objects are from a collection consisting of an instance of the class and an instance of a subclass of the class;
   (d) means, performed by the computer, for sending a message to the first sending object;
   (e) means, performed by the computer, for broadcasting the message from the first sending object to the group; and
   (f) means, performed by the computer, for forwarding the message to every receiving object in the group.

8. The apparatus of claim 7 wherein each receiving object in the group behaves according to the forwarded message.

9. The apparatus of claim 7 wherein the means for broadcasting works for objects and references.

10. The apparatus of claim 7 wherein the means for creating further comprises means for specifying a multiplicity.

11. The apparatus of claim 7 wherein the means for sending a second message comprises means for sending the second message using a name of the class for the group.

12. The apparatus of claim 7 wherein the class for the group maintains:
    means for adding an object to the group; and
    means for deleting an object from the group.

13. An article of manufacture comprising a program storage medium readable by a computer having a memory, the medium tangibly embodying one or more programs of instructions executable by the computer to perform method steps for broadcasting a message within an object-oriented modeling system, the method comprising:
   (a) creating a first sending object in an object model;
   (b) creating a group in the object model, said creating comprising:
      (1) specifying a class for the group; and
      (2) specifying at least one receiving object for said group in the object model, wherein the receiving object is from a collection consisting of an instance of the class and an instance of a subclass of the class;
   (c) sending a message to the first sending object;
   (d) broadcasting the message from the first sending object to the group; and
   (e) forwarding the message to every receiving object in the group.

14. The article of manufacture of claim 13 wherein each receiving object in the group behaves according to the forwarded message.

15. The article of manufacture of claim 13 wherein the broadcasting works for objects and references.

16. The article of manufacture of claim 13 wherein the creating further comprises specifying a multiplicity.

17. The article of manufacture of claim 13 wherein the sending a second message comprises sending the second message using a name of the class for the group.

18. The article of manufacture of claim 13 wherein the class for the group maintains the ability to:
    add an object to the group; and
    delete an object from the group.

* * * * *